UNITED STATES PATENT OFFICE.

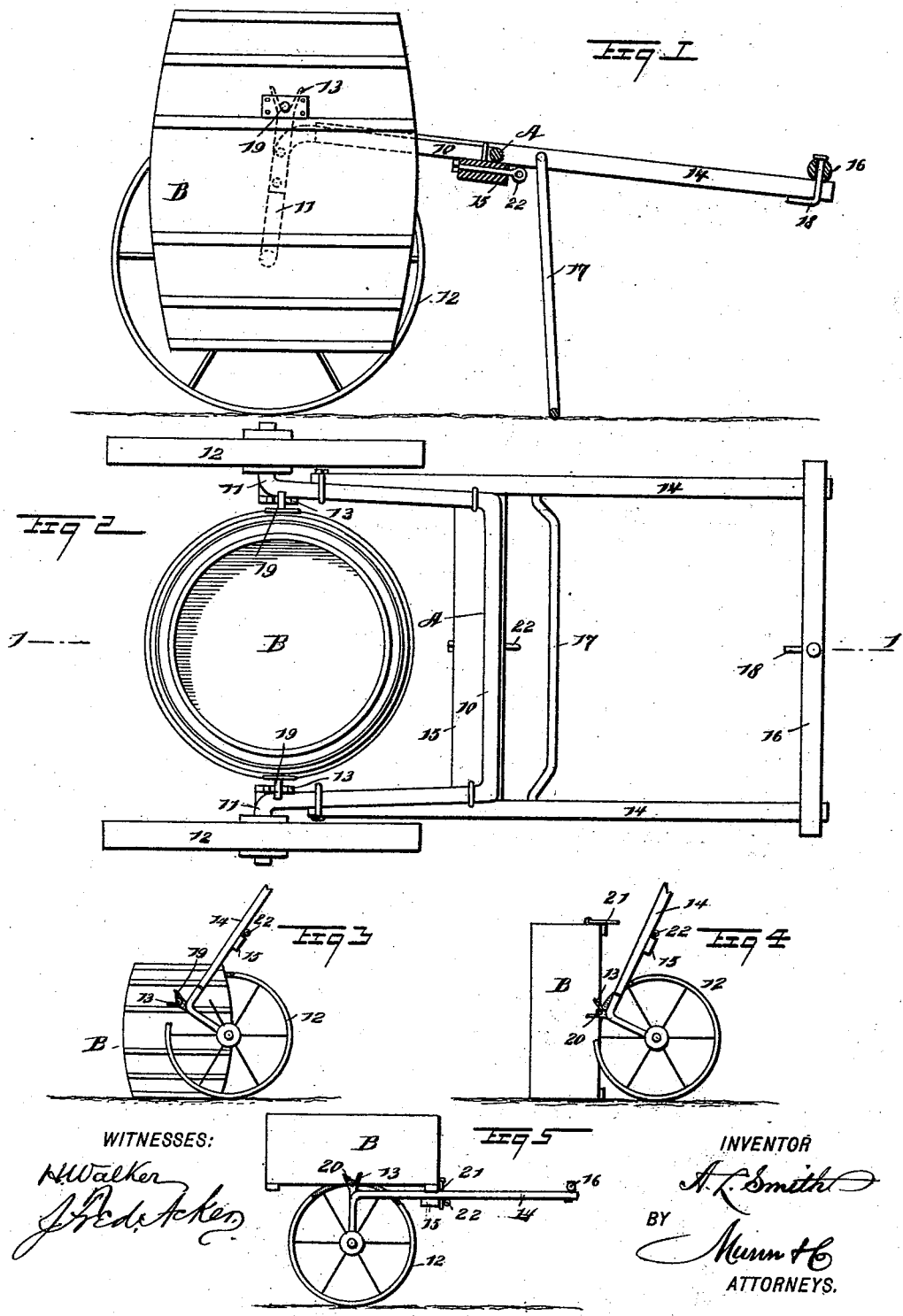

AMASA L. SMITH, OF CARNES, IOWA.

CART.

SPECIFICATION forming part of Letters Patent No. 536,485, dated March 26, 1895.

Application filed September 22, 1894. Serial No. 523,792. (No model.)

*To all whom it may concern:*

Be it known that I, AMASA L. SMITH, of Carnes, in the county of Sioux and State of Iowa, have invented a new and Improved Cart, of which the following is a full, clear, and exact description.

My invention relates to an improvement in carts, and especially to an improvement in carts adapted to carry sweepings, swill, slops, &c., being particularly adapted for use as a slop cart.

The object of the invention is to provide a running gear of simple and durable construction, capable of being drawn or pushed by an individual, the said running gear being so constructed that it will receive a dumping box body, or a barrel-like receptacle, and furthermore to provide a means whereby either receptacle may be expeditiously taken up from the ground by the manipulation of the running gear without the receptacle being touched by the operator, and in this manner the operator be enabled to lift a load which would otherwise require the services of many men.

Another object of the invention is to provide a cart such as heretofore described which will be of simple, durable and economic construction.

The invention consists in the novel construction and combination of the several parts, as will be hereinafter fully set forth, and pointed out in the claim.

Reference is to be had to the accompanying drawings, forming a part of this specification, in which similar figures and letters of reference indicate corresponding parts in all the views.

Figure 1 is a longitudinal vertical section through the running gear, the said section being taken on the line 1—1 of Fig. 2, the said figure likewise illustrating the barrel-like receptacle in carrying position on the running gear. Fig. 2 is a plan view of the cart as shown in Fig. 1. Fig. 3 is a side elevation of the cart, illustrating the manner in which the barrel-like receptacle is deposited on the ground or taken up therefrom. Fig. 4 is a view similar to Fig. 3, illustrating an adaptation of the running gear to a box body. Fig. 5 is a side elevation of the cart, the box body being in carrying position on the running gear.

In carrying out the invention the axle A of the cart is an arch axle, and consists of a horizontal yoke-like body 10, the members of which are made to diverge as shown in Fig. 2, and from the rear end of each member of the yoke body an angled axle arm 11, is downwardly projected, the horizontal members of the said axle arm having ground wheels 12 loosely mounted thereon; and at the upper end of the vertical portion of each axle arm a socket 13 of fork-like construction is located, extending upward beyond the horizontal plane of the yoke body 10, as shown in Fig. 1.

Shafts 14, are attached to the side members of the horizontal yoke body 10 of the axle, and the forward bow member of the said body of the axle is secured upon a cross bar 15, which connects the shafts near their rear ends, the shafts being connected at their outer or forward ends by a cross bar 16, which is used as a push bar.

A leg 17, of yoke-like construction, is utilized to support the shafts in a horizontal position when the transverse portion or bow of said leg is in engagement with the ground, as shown in Fig. 1, and the upper extremities of the end portions of the leg are pivoted in the inner faces of the shafts 14. A button 18, is usually located in the cross bar 16 of the shafts to lock the leg 17 in an upper position beneath the shafts when the cart is pushed along the ground, the leg being so pivoted that when in its elevated horizontal position its transverse portion will lie closely adjacent to the cross bar 16 of the shafts, whereby the said cross bar is braced and strengthened in a novel manner. The end portions of the leg are also bent in such a manner as to lie, when the leg is in its raised position, closely adjacent to the inner faces of the shafts whereby the same are further strengthened.

The running gear above described may be utilized to carry a barrel-like receptacle, as shown in Figs. 1, 2 and 3, or a box body, as illustrated in Figs. 4 and 5. When the barrel receptacle is employed, pins or lugs 19 are secured upon its outer face between the center and the upper edge, the said pins being adapted to be received by the sockets 13 of the said running gear, and under this construction, when the barrel for example is upon the ground, as shown in Fig. 3, and has been filled with material, by lifting up the shafts 14, bringing the sockets beneath the pins 19 of the barrel, the barrel may be raised very readily and conveniently, no matter how heavy, by simply pressing downward upon the shafts and restoring them to their normal position, as shown in Fig. 1. The barrel is gently dropped upon the ground by allowing the shafts to be elevated as shown likewise in Fig. 3. When a box body is employed instead of the barrel-receptacle, the pivot pins 20 located at opposite sides of the body are placed between its center and forward end, and when the tail-board or rear end of the box body rests upon the ground, as shown in Fig. 4, which will be its dumping position, the said body may be lifted up in like manner as the barrel receptacle; and when the box body has been raised its forward end is carried downward upon the shafts, and a staple 21, or its equivalent is engaged with a pin or keeper 22 on the rear cross bar of the shafts, as shown in Fig. 5, thereby locking the box body in its horizontal or carrying position.

Having thus described my invention, I claim as new and desire to secure by Letters Patent—

The combination of the cart axle comprising an integral yoke-like body having the rear portions of its arms bent down at right angles to the plane of the body and having their lower extremities adapted to receive the wheels, the said wheels, shafts extending parallel to the arms of said body and secured at their rear ends thereto, and a cross bar secured to opposite ends of the respective shafts, and extending under and parallel to the transverse portion of said yoke-like body, said cross bar being secured at its ends to ends of the transverse portion of the yoke-like body substantially as set forth.

AMASA L. SMITH.

Witnesses:
CLARENDON DIER,
C. D. ECKERMAN.